(12) United States Patent
Mullis et al.

(10) Patent No.: US 11,336,564 B1
(45) Date of Patent: May 17, 2022

(54) DETECTION OF ACTIVE HOSTS USING PARALLEL REDUNDANCY PROTOCOL IN SOFTWARE DEFINED NETWORKS

(71) Applicant: Schweitzer Engineering Laboratories, Inc., Pullman, WA (US)

(72) Inventors: Tristan Lloyd Mullis, Pullman, WA (US); Rhett Smith, Odessa, FL (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 0 days.

(21) Appl. No.: 17/463,869

(22) Filed: Sep. 1, 2021

(51) Int. Cl.
*H04L 45/24* (2022.01)
*H04L 61/10* (2022.01)
*H04L 69/22* (2022.01)
*H04L 69/14* (2022.01)
*H04L 69/40* (2022.01)

(52) U.S. Cl.
CPC .............. *H04L 45/24* (2013.01); *H04L 61/10* (2013.01); *H04L 69/14* (2013.01); *H04L 69/22* (2013.01); *H04L 69/40* (2013.01)

(58) Field of Classification Search
CPC ......... H04L 45/24; H04L 61/10; H04L 69/14; H04L 69/22; H04L 69/40
See application file for complete search history.

(56) References Cited

U.S. PATENT DOCUMENTS

| | | | |
|---|---|---|---|
| 6,747,957 B1 | 6/2004 | Pithawala | |
| 7,218,632 B1 | 5/2007 | Bechtolsheim | |
| 7,266,849 B1 | 9/2007 | Gregory | |

(Continued)

FOREIGN PATENT DOCUMENTS

| | | | |
|---|---|---|---|
| CN | 113709046 A | * 11/2021 | |
| EP | 2765751 | 8/2014 | |

(Continued)

OTHER PUBLICATIONS

Braun, Wolfgang, Menth, Michael, Software-Defined Networking Using OpenFlow: Protocols, Applications and Architectural Design Choices, Future Internet, May 12, 2014.

(Continued)

*Primary Examiner* — George C Neurauter, Jr.
(74) *Attorney, Agent, or Firm* — Jared L. Cherry

(57) ABSTRACT

This disclosure pertains to identifying a host using parallel redundancy protocol (PRP) and properly configuring communication circuits for the device in a software defined network (SDN). In one embodiment, a system includes a network in communication with a first communication host and a second communication host, the network comprising a plurality of switches interconnected with a plurality of physical links. An SDN controller in communication with the network includes a PRP identification subsystem to identify PRP traffic from the first communication host and destined for the second communication host. The SDN controller generates a first address resolution protocol (ARP) message directed to the second communication host and receive a first response from the second communication host to the ARP message that conforms to PRP. Based on the response, a traffic routing subsystem provisions communication flows between the first communication host and the second communication host to route PRP traffic.

22 Claims, 10 Drawing Sheets

(56) References Cited

U.S. PATENT DOCUMENTS

| | | | |
|---|---|---|---|
| 7,376,831 B2 | 5/2008 | Kollmyer | |
| 7,872,983 B2 | 1/2011 | Lai | |
| 8,347,079 B2 | 1/2013 | Cho | |
| 8,520,670 B1 | 8/2013 | Giniger | |
| 8,553,544 B2 | 10/2013 | Lai | |
| 8,800,044 B2 | 8/2014 | Raad | |
| 8,989,380 B1 | 3/2015 | Belser | |
| 9,038,151 B1 | 5/2015 | Chua | |
| 9,237,129 B2 | 1/2016 | Ling | |
| 9,286,171 B2 | 3/2016 | Cardona | |
| 9,426,060 B2 * | 8/2016 | Dixon | H04L 61/6022 |
| 9,432,255 B1 | 8/2016 | Hasan | |
| 9,432,380 B2 | 8/2016 | Margalit | |
| 9,673,995 B2 * | 6/2017 | Angst | H04L 12/4641 |
| 9,680,588 B2 | 6/2017 | Connolly | |
| 9,686,125 B2 | 6/2017 | Smith | |
| 9,760,504 B2 | 9/2017 | Chinnakkonda Vidyapoornachary | |
| 9,769,060 B2 | 9/2017 | Dearien | |
| 10,044,644 B2 * | 8/2018 | Ma | H04L 69/40 |
| 10,182,005 B2 * | 1/2019 | Dixon | H04L 12/184 |
| 10,863,558 B2 | 12/2020 | Powers | |
| 11,165,685 B2 | 11/2021 | Mullis | |
| 11,228,521 B2 | 1/2022 | Mullis | |
| 2002/0023217 A1 | 2/2002 | Wheeler | |
| 2002/0172157 A1 | 11/2002 | Rhodes | |
| 2003/0112821 A1 | 6/2003 | Cleveland | |
| 2003/0125924 A1 | 7/2003 | Lines | |
| 2003/0133443 A1 | 7/2003 | Klinker | |
| 2003/0188159 A1 | 10/2003 | Josset | |
| 2005/0025141 A1 | 2/2005 | Chao | |
| 2005/0078672 A1 | 4/2005 | Caliskan | |
| 2005/0192008 A1 | 9/2005 | Desai | |
| 2007/0143838 A1 | 6/2007 | Milligan | |
| 2007/0217344 A1 | 9/2007 | Krywaniuk | |
| 2008/0055558 A1 | 1/2008 | Hadley | |
| 2008/0080384 A1 | 4/2008 | Atkins | |
| 2008/0184030 A1 | 7/2008 | Kelly | |
| 2008/0204248 A1 | 8/2008 | Cam Winget | |
| 2009/0252309 A1 | 10/2009 | Beyer | |
| 2009/0257743 A1 | 10/2009 | Chung | |
| 2009/0265470 A1 | 10/2009 | Shen | |
| 2009/0285093 A1 | 11/2009 | Bolt | |
| 2009/0313189 A1 | 12/2009 | Sun | |
| 2010/0241608 A1 | 9/2010 | Huang | |
| 2011/0085567 A1 | 4/2011 | Beecroft | |
| 2011/0087952 A1 | 4/2011 | Marin | |
| 2013/0035066 A1 | 2/2013 | Nylander | |
| 2013/0067552 A1 | 3/2013 | Hawkes | |
| 2013/0077477 A1 | 3/2013 | Daraiseh | |
| 2013/0108259 A1 | 5/2013 | Srinivas | |
| 2013/0159865 A1 | 6/2013 | Smith | |
| 2013/0212285 A1 | 8/2013 | Hoffmann | |
| 2013/0227646 A1 | 8/2013 | Haggerty | |
| 2013/0250770 A1 | 9/2013 | Zou | |
| 2013/0263247 A1 | 10/2013 | Jungck | |
| 2013/0290735 A1 | 10/2013 | Rombouts | |
| 2013/0294228 A1 | 11/2013 | Ahuja | |
| 2014/0025945 A1 | 1/2014 | McGrew | |
| 2014/0029451 A1 | 1/2014 | Nguyen | |
| 2014/0064100 A1 | 3/2014 | Edwards | |
| 2014/0112130 A1 | 4/2014 | Yang | |
| 2014/0115706 A1 | 4/2014 | Silva | |
| 2014/0129700 A1 | 5/2014 | Mehta | |
| 2014/0153572 A1 | 6/2014 | Hampel | |
| 2014/0160939 A1 | 6/2014 | Arad | |
| 2014/0226467 A1 | 8/2014 | Park | |
| 2014/0241345 A1 | 8/2014 | DeCusatis | |
| 2014/0245387 A1 | 8/2014 | Colpo | |
| 2014/0280834 A1 | 9/2014 | Medved | |
| 2014/0325038 A1 | 10/2014 | Kis | |
| 2014/0325649 A1 | 10/2014 | Zhang | |
| 2014/0371941 A1 | 12/2014 | Keller | |
| 2014/0376406 A1 | 12/2014 | Kim | |
| 2015/0081762 A1 | 3/2015 | Mason | |
| 2015/0112933 A1 | 4/2015 | Satapathy | |
| 2015/0195190 A1 | 7/2015 | Shah Heydari | |
| 2015/0312658 A1 | 10/2015 | Winzer | |
| 2015/0363522 A1 | 12/2015 | Maurya | |
| 2016/0043996 A1 | 2/2016 | Syed Mohamed | |
| 2016/0119299 A1 | 4/2016 | Amulothu | |
| 2016/0142427 A1 | 5/2016 | de los Reyes | |
| 2016/0165454 A1 | 6/2016 | Li | |
| 2016/0277195 A1 | 9/2016 | Maeda | |
| 2016/0330076 A1 | 11/2016 | Tiwari | |
| 2016/0337247 A1 | 11/2016 | Yao | |
| 2016/0344592 A1 | 11/2016 | Cook | |
| 2016/0359629 A1 | 12/2016 | Nadathur | |
| 2017/0026187 A1 | 1/2017 | Ramatchandirane | |
| 2017/0026225 A1 | 1/2017 | Smith | |
| 2017/0026226 A1 | 1/2017 | Grussling | |
| 2017/0026243 A1 | 1/2017 | Berner | |
| 2017/0026252 A1 | 1/2017 | Dearien | |
| 2017/0026276 A1 | 1/2017 | Dearien | |
| 2017/0026291 A1 | 1/2017 | Smith | |
| 2017/0026292 A1 | 1/2017 | Smith | |
| 2017/0026349 A1 | 1/2017 | Smith | |
| 2017/0201488 A1 | 7/2017 | Krywaniuk | |
| 2017/0289117 A1 | 10/2017 | Powers | |
| 2017/0302656 A1 | 10/2017 | Ramatchandirane | |
| 2017/0317780 A1 | 11/2017 | Wood | |
| 2017/0346630 A1 | 11/2017 | Nadathur | |
| 2018/0027405 A1 | 1/2018 | Holtmanns | |
| 2018/0219798 A1 * | 8/2018 | Dutil | H04L 67/1097 |
| 2019/0116053 A1 | 4/2019 | Allan | |
| 2019/0273717 A1 | 9/2019 | Dearien | |
| 2021/0135972 A1 | 5/2021 | Mullis | |
| 2021/0194791 A1 | 6/2021 | Mullis | |
| 2022/0045946 A1 * | 2/2022 | Keskin | H04L 45/021 |

FOREIGN PATENT DOCUMENTS

| | | |
|---|---|---|
| KR | 20150051107 | 5/2015 |
| WO | 2011133912 | 10/2011 |
| WO | 2015038040 | 3/2015 |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tai, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

Yang, Qiaoyin and Smith, Rhett, Improve Protection Communications Network Reliability Through Software-Defined Process Bus, Jan. 2018.

Dearien, Jason: "Setting Up a Fully Redundant RSTP-to-SDN Tie Point" Application Guide, vol. II AG2017-28, Sep. 22, 2017.

* cited by examiner

DETECTION OF ACTIVE HOSTS USING PARALLEL REDUNDANCY PROTOCOL IN SOFTWARE DEFINED NETWORKS

TECHNICAL FIELD

The present disclosure pertains to systems and methods for integration of a parallel redundancy protocol ("PRP") in a software defined network ("SDN").

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Figure 1:
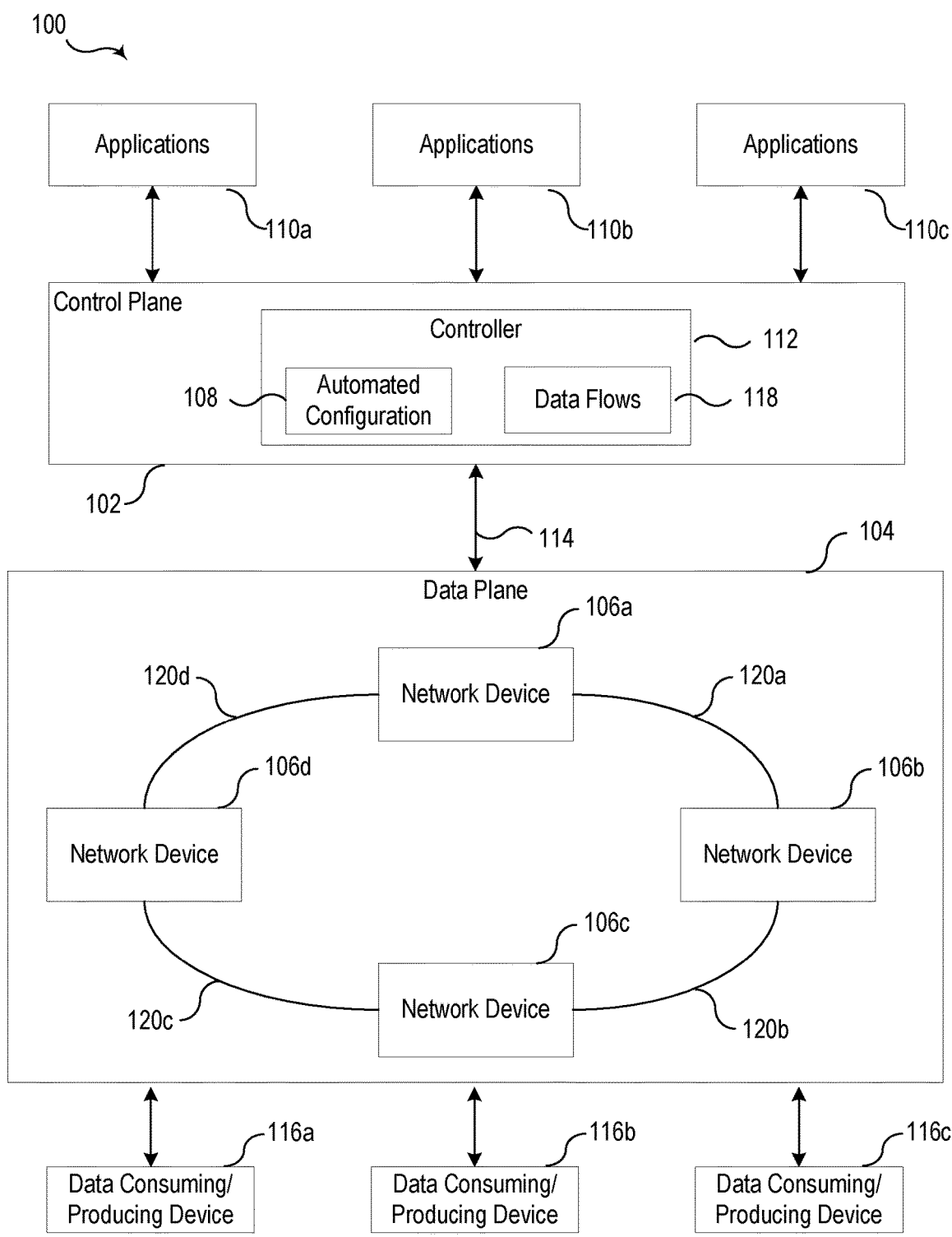
FIG. 1 illustrates a conceptual representation of an SDN architecture including a control plane, a data plane, and a plurality of data consumer/producer devices that may be deployed in an electric power transmission and distribution system consistent with embodiments of the present disclosure.

PRP is a network protocol standard for Ethernet that provides redundancy and protects against single points of failure. A PRP-enabled device has two communication ports, each of which is attached to a separate local area network ("LAN"). To avoid a single point of failure, the two LANs may use distinct physical links, and thus may be assumed to be fail-independent. As long as one path is operational, the destination application always receives at least one frame. The redundancy provided by PRP may be implemented by network devices, and thus may be invisible to applications. Similar protocols, such as High-availability Seamless Redundancy (HSR), may provide benefits in terms of redundancy and reliability. PRP offers certain advantages over HSR, such as the ability to connect non-PRP devices to the same network. In contrast, when a non-HSR device is connected to a HSR network, the device typically connects through a redundancy box (RedBox).

High reliability and redundant communication networks offer advantages that may be utilized in an infrastructure system (e.g., electric power systems, telecommunication systems, etc.), manufacturing systems, alarm systems, and a variety of other applications. Such networks, which may be referred to as operational technology ("OT") networks, may manage, monitor, and control a wide range of devices. OT networks may comprise a large number of machine-to-machine communications, and as such, large volumes of data may be generated and transmitted. Management of such networks may present a variety of challenges.

OT networks may utilize a variety of technologies, including SDN networking technologies. In an SDN, a controller may regulate communications on the network. SDN networking technologies offer a variety of advantages, such as deny-by-default security, latency guarantees, deterministic transport capabilities, redundancy, and fail-over planning, etc. An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be used to optimize the usage of network resources by creating specific data flows through the communication network. A data flow, as the term is used herein, refers to a set of parameters used to match and take action based on network packet contents. Data flows may permit dedicated paths based on a variety of criteria that offer significant control and precision to operators of the network. In contrast, in large traditional networks, trying to match a network-discovered path with an application-desired data path may be a challenging task involving changing configurations in many devices. To compound this problem, the management interfaces and feature sets used on many devices are not standardized. Further, network administrators often need to reconfigure the network to avoid loops, gain route convergence speed, and prioritize certain classes of applications.

Significant complexity in managing a traditional network in the context of an OT network arises from the fact that each network device (e.g., a switch or router) includes both control logic and data forwarding logic. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or a Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In contrast, in an SDN, a controller embodies the control plane and determines how packets (or frames) should flow (or be forwarded) in the network. The controller communicates this information to the network devices, which constitute the data plane. The controller may set forwarding tables in network devices that establish how data is to be routed. This enables centralized configuration and management of a network. In addition to simplifying the management of a network, an SDN architecture may also enable monitoring and troubleshooting features that may be beneficial for use in OT networks. Such features may include, but are not limited to: mirroring a data-selected flow rather than mirroring a whole port; alarming on bandwidth when it gets close to saturation; providing metrics (e.g., counters and meters for quality of service, packet counts, errors, drops, or overruns, etc.) for a specified flow; and permitting the monitoring of specified applications rather than monitoring based on virtual local area networks (VLAN) or media access control (MAC) addresses.

Use of PRP or other redundant communication protocols in an SDN may involve configuration of parallel redundant communication flows between devices. If such flows are not correctly implemented, PRP communications may not be correctly routed in the data plane, and the benefits afforded by use of PRP may be lost. Implementing parallel redundant paths adds to the burden of configuring and maintaining an SDN.

The inventors of the present application have recognized that certain advantages may be realized by automating the identification and configuration of PRP devices in an SDN. The techniques disclosed herein may be used in a variety of specific applications, including:

A controller may automatically discover devices using PRP and automatically configure communication flows on parallel redundant paths;

A controller may identify and perform SDN configuration for PRP supervisory frames transmitted between detected PRP devices.

A controller may discover active hosts in an SDN using PRP using Address Resolution Protocol ("ARP") packets generated by a controller;

An in-band controller may determine whether the controller is running on a device configured for PRP communication;

Physically separate PRP networks with inter-connection links may be provided to provide additional fault tolerance;

PRP planning may be performed such that PRP traffic on a first local area network (LAN) uses distinct nodes from PRP on a second LAN; and Multiple virtual PRP networks may be overlaid on the same physical network infrastructure.

The embodiments of the present disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a conceptual representation of an SDN system 100 including a control plane 102, a data plane 104, and a plurality of data consumer/producer devices 116*a*-116*c* consistent with embodiments of the present disclosure. The control plane 102 directs the flow of data through the data plane 104. More specifically, a controller 112 may communicate with a plurality of network devices 106*a*-106*d* via an interface 114 to establish data flows 118. The controller 112 may specify rules for routing traffic through the data plane 104 based on a variety of criteria.

The data plane 104 includes the plurality of network devices 106*a*-106*d* in communication with one another via a plurality of physical links 120*a*-120*d*. In various embodiments, the network devices 106*a*-106*d* may be embodied as switches, multiplexers, and other types of network devices. The physical links 120a-120d may be embodied as Ethernet, fiber optic, and other forms of data communication channels. As illustrated, the physical links 120a-120d between the network devices 106a-106d may provide redundant connections such that a failure of one of the physical links 120a-120d is incapable of completely blocking communication with an affected network device. In some embodiments, the physical links 120a-120d may provide an N−1 redundancy or better.

Data consuming/producing devices 116a-116c may represent a variety of devices within that produce or consume data. For example, data consuming/producing devices 116a-116c may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasors, etc.) and may communicate the measurements to implement a protection strategy for the transmission line. Traffic between the transmission line relays may be routed through the data plane 104 using a plurality of data flows 118 implemented by controller 112. Data consuming/producing devices 116a-116c may be embodied by a wide range of devices consistent with embodiments of the present disclosure.

Applications 110a-110c may represent a variety of applications operating in an applications plane. In the SDN architecture illustrated in FIG. 1, controller 112 may expose an application programming interface (API) that applications 110a-110c can use to configure the data plane 104. In addition to an API, other mechanisms may be used to configure the data plane 104. Controller 112 may interface with the data plane 104 and identify communication flows while the control logic resides in the applications 110a-110c. The configuration of controller 112 and applications 110a-110c may be tailored to meet a wide variety of specific needs.

Data consuming/producing devices 116a-116c may transmit information to one or more network devices embodied as SDN switches 106a-106d. The data from data consuming/producing devices 116a-116c may be routed by data plane 104 according to the plurality of data flows 118 specified by controller 112.

Controller 112 may support automated configuration 108 based on approved services, parameters, and data metrics. Upon detection of a communication associated with an approved service and parameters, controller 112 may generate corresponding data flow(s) 118. In some embodiments, the automated configuration may occur during a commissioning phase, while in other embodiments, automated configuration 108 may be ongoing while system 100 is in operation. Information about automating configuration during a commissioning phase is described in U.S. Pat. No. 9,923,779, which is incorporated herein by reference.

Figure 2A:
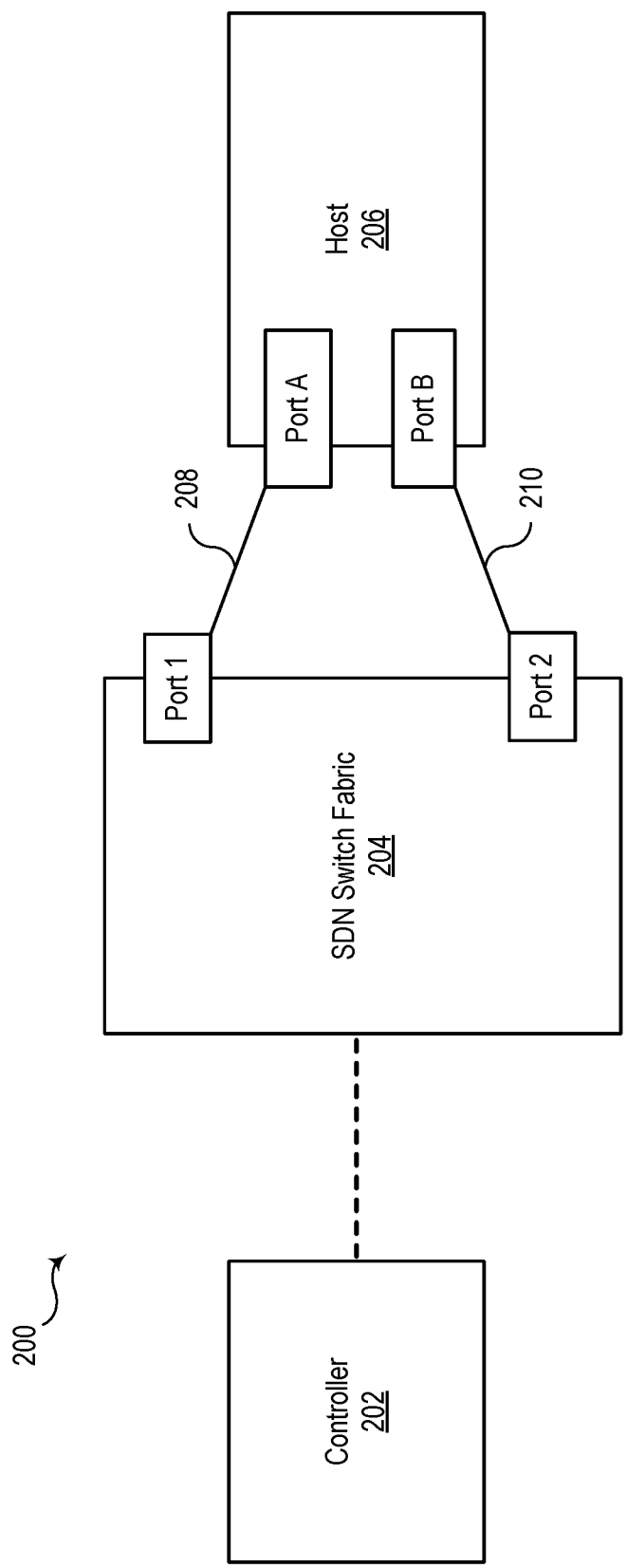
FIG. 2A illustrates a block diagram of a system in which a controller is configured to determine that a host is configured to use PRP and to configure PRP communication flows consistent with embodiments of the present disclosure.

FIG. 2A illustrates a block diagram of a system 200 in which a controller 202 is configured to determine that a host 206 is configured to use PRP and to configure PRP communication flows consistent with embodiments of the present disclosure. Host 206 is in communication with SDN switch fabric 204 through redundant communication links 208 and 210. As illustrated, port 1 of the SDN switch fabric 204, which can be one or more physical switches, is in communication via communication link 208 with port A, and port 2 of the SDN switch fabric 204 is in communication via communication link 210 with port B.

A controller 202 is in communication with SDN switch fabric 204. Controller 202 may program devices in SDN switch fabric 204 using communication flows. The communication flows may be used by SDN switch fabric 204 to route traffic between devices in the SDN switch fabric 204 and devices connected to the SDN switch fabric 204. Controller 202 may utilize a variety of protocols (e.g., OpenFlow) and technologies to configure SDN switch fabric 204.

Host 206 may be configured to implement PRP. Duplicate packets may be transmitted to host 206 using communication links 208 and 210. If host 206 receives duplicate packets, one of the duplicate packets may be retained and one may be discarded. The retained packet may be passed along to an application operating on host 206. Host 206 may embody a variety of types of equipment. In some embodiments, host 206 may be embodied as an intelligent electronic device (IED). As used herein, an IED may refer to any microprocessor-based device that monitors, controls, automates, and/or protects monitored equipment within an electric power system. Such devices may include, for example, remote terminal units, differential relays, distance relays, directional relays, feeder relays, overcurrent relays, transformer relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

In operation, controller 202 may determine whether host 206 is configured to implement PRP by monitoring traffic from host 206. For example, when Port A egresses a packet into Port 1, controller 202 may intercept and analyze the packet. Analysis of the packet may allow controller 202 to determine that Port A is emitting PRP traffic. In addition, traffic from Port B may be analyzed by controller 202. In various embodiments, Port A and Port B may be connected to separate LANs, which may be comprised within SDN switch fabric 204. Systems consistent with the present disclosure may identify that the host is in a PRP configuration and identify which port is connected to each LAN so that packets are routed to the correct interface (e.g., packets for LAN A are routed to the port associated with LAN A, and packets for LAN B are routed to the port associated with LAN B).

In some embodiments, controller 202 may monitor traffic from a newly discovered device to determine whether the device is configured to communicate using PRP. For example, upon connection of host 206, traffic from host 206 may be routed to controller 202, and controller 202 may determine whether the traffic includes pairs of packets that conform to PRP. Such embodiments may allow for the passive detection of PRP devices. In other embodiments described in greater detail below, a more active process may be employed to identify devices configured to communicate using PRP.

Based on detection of PRP traffic emitted by host 206, controller 202 may implement various settings and communication flows. In contrast, typical systems require that users know PRP device configurations, correctly configure the SDN to pass the redundant traffic through separate LANs and to the correct ports on the remote device, and correctly connect this device's ports to the network. Manual configuration is error prone, and mistakes are time consuming to troubleshoot. In contrast, by automatically determining that host 206 is using PRP, the configuration burden may be eased by implementing PRP communication between host 206 and another device (not shown) using PRP without user intervention.

Figure 2B:
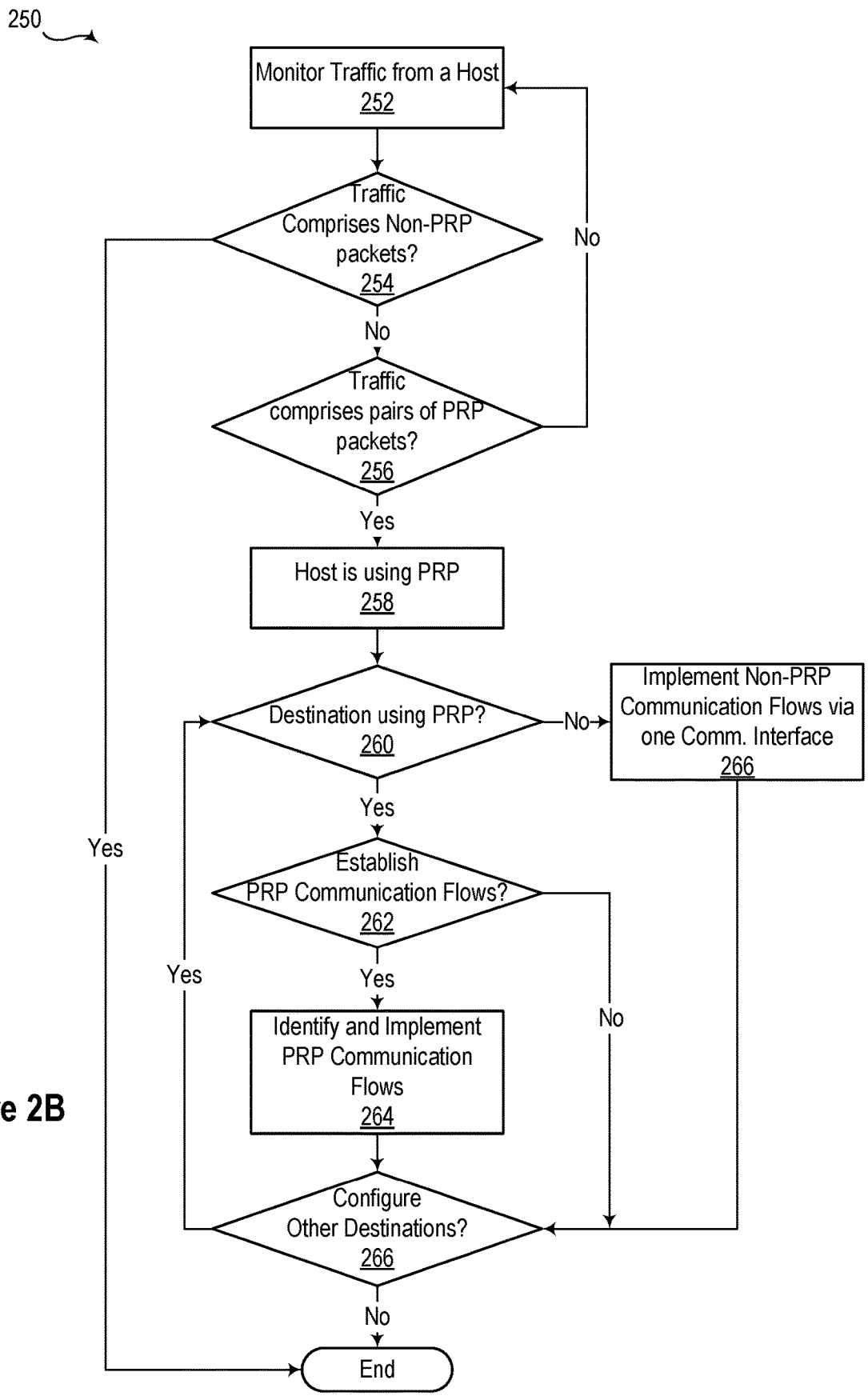
FIG. 2B illustrates a method to automatically determine that a host is using PRP and to automatically configure PRP communication flows consistent with embodiments of the present disclosure.

FIG. 2B illustrates a method 250 to automatically determine that a host is using PRP and to automatically configure PRP communication flows consistent with embodiments of the present disclosure. Method 250 may be used in systems in which some devices operate using PRP and other devices do not use PRP. In such systems, method 250 may identify devices using PRP and configure appropriate communication flows to enable PRP communications, while also configuring communication flows to enable non-PRP communications.

At 252, traffic from a host may be monitored. If a system implementing method 250 determines at 254 that the traffic emitted by the host comprises non-PRP packets, the method may end because the host is not using PRP. A determination of whether the traffic comprises PRP packets at 256 may be made based on both the number of packets received as well as the packet structure. PRP packets include a redundancy control trailer (RCT) that is added to each frame and that includes a sequence number to allow a receiving device to discard duplicate frames. Upon receipt of a pair of PRP packets from a host, method 250 may determine that the host is using PRP at 258.

At 260, a system implementing method 250 may determine whether a destination for the PRP traffic is also configured using PRP. In some embodiments, traffic from the destination may be monitored to determine if such traffic is PRP traffic. Alternative, techniques discussed in greater detail in connection with FIG. 3B may be used to determine whether the destination device is configured using PRP. If method 250 determines that the destination host is not using PRP at 260, non-PRP communication flows may be implemented using only one communication interface at 266.

Based on the determination that a host and a destination are both using PRP, a system implementing method 250 may determine whether to establish PRP communication flows at 262. In some embodiments, communication flows may be established without user intervention. In other words, a system implementing method 250 may automatically establish the communication flows associated with PRP communication from the host. In other embodiments, an operator may be prompted to accept a communication flow before creation of the communication flow.

If PRP communication flows are to be established, they may be identified and implemented at 264. Automation of the communication PRP flows may reduce the configuration burden associated with implementing PRP. A system implementing method 250 may automatically implement communication flows using paths through an SDN switch fabric that rely on physically distinct devices to avoid single points of failure and to achieve other benefits.

In some embodiments, part of the automated configuration may include configuring supervisory frames transmitted between PRP devices. PRP uses supervisory frames with Ethertype 0x88FB to manage how traffic is sent between PRP devices. The proper routing of supervisory frames is necessary to ensure proper communication between PRP devices. Supervisory frames may facilitate use of PRP devices and non-PRP in the same system.

At 266, method 250 may determine if there are other destinations to configure. Using this approach, communications for each PRP-enabled destination may be configured, and communications for each non-PRP-enabled destination may also be configured. Stated in other terms, each communication circuit may be identified and configured, whether or not the destination in the communication circuit is PRP-enabled.

Figure 3A:
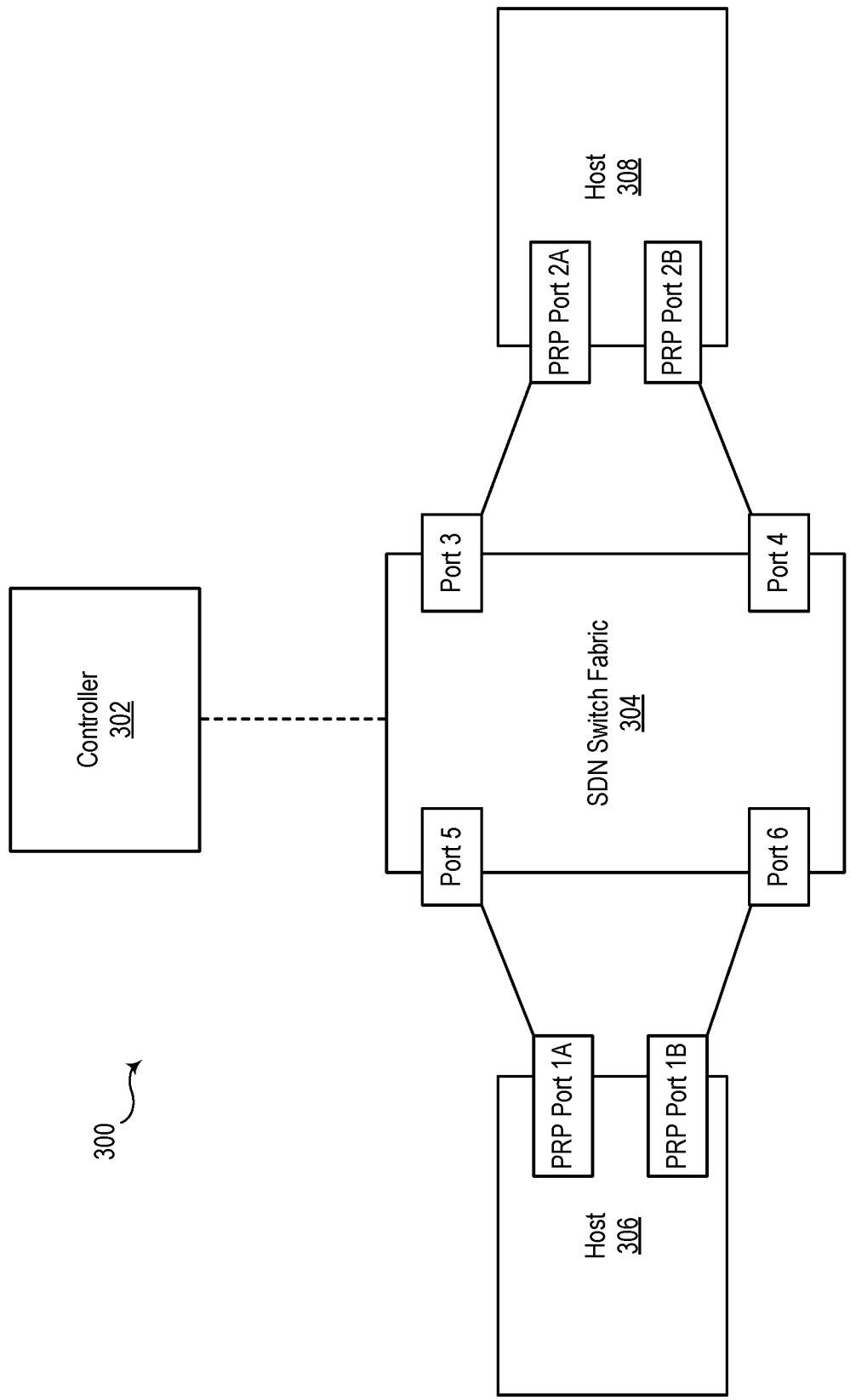
FIG. 3A illustrates a block diagram of a system to discover transmitting PRP hosts in an SDN consistent with embodiments of the present disclosure.

FIG. 3A illustrates a block diagram of a system 300 to discover transmitting PRP hosts in an SDN consistent with embodiments of the present disclosure. In an initial state, controller 302 may not be aware of host 306 or host 308. When host 306 egresses a packet addressed to host 308, controller 302 may detect that host 306 is communicating with PRP, as described in connection with method 250, illustrated in FIG. 2B. If a PRP-configured device receives a non-PRP packet and responds, then the response will not be a PRP response. If a non-PRP device receives a PRP packet, it can respond to the packet and the response will not be a PRP response.

Using either packet that is received on port 5 or port 6 from 306, controller 302 may identify that the traffic is PRP and determine that host 308 is currently unknown. Controller 302 may attempt to discover host 308 and determine if host 308 is in a PRP configuration. To make this determination, controller 302 may generate a custom ARP packet that includes a redundancy control trailer (RCT) that elicits a response from host 308. If the response consists of a single non-PRP packet (received on either port 3 or port 4), controller 302 can determine that host 308 is not configured to use PRP. If the response consists of a pair of PRP packets, with one packet being received by port 3 and the other by port 4, controller 302 can determine that host 308 is operating using PRP.

Figure 3B:
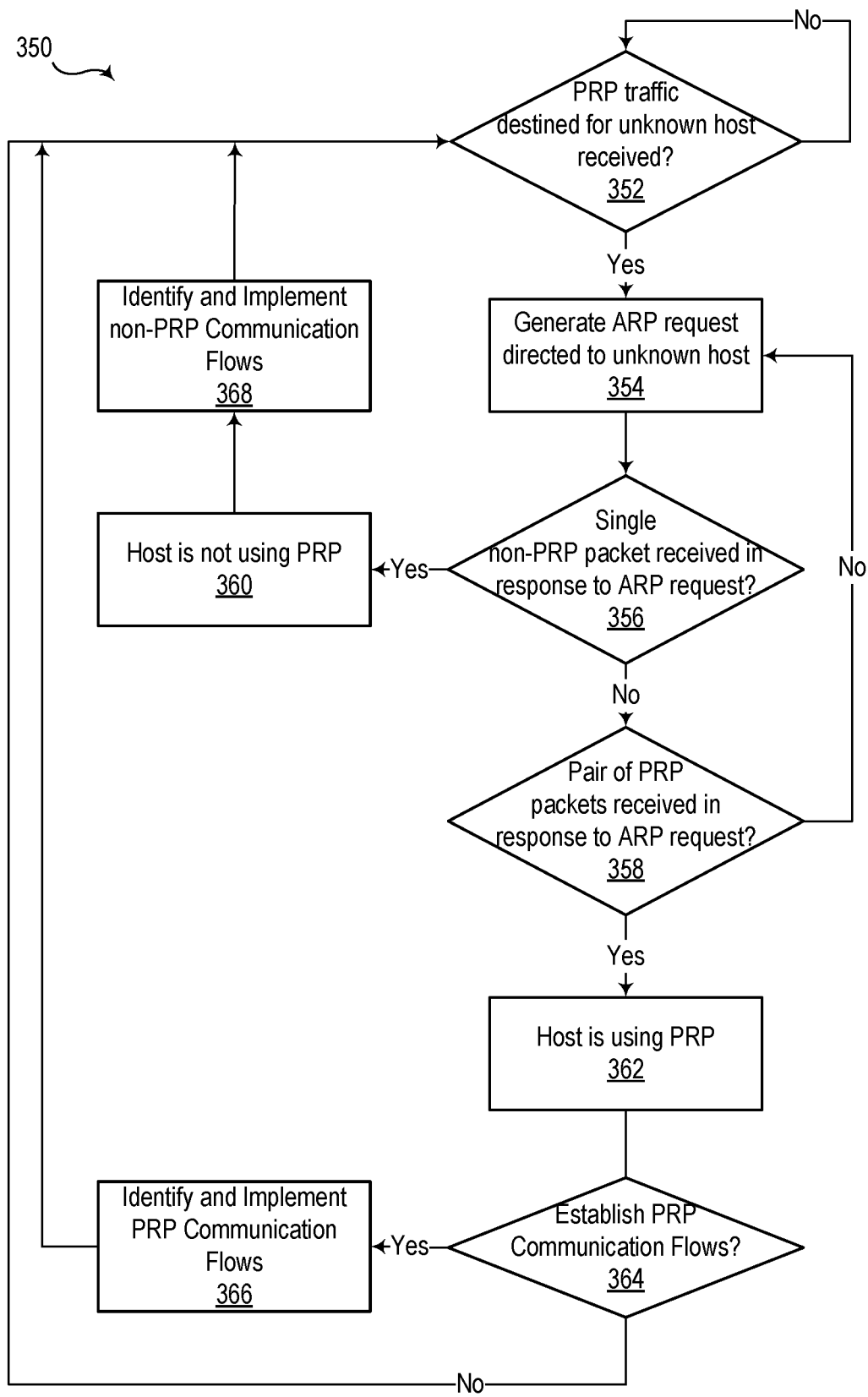
FIG. 3B illustrates a flow chart of a method to discover PRP hosts in an SDN consistent with embodiments of the present disclosure.

FIG. 3B illustrates a flow chart of a method 350 to discover PRP hosts in an SDN consistent with embodiments of the present disclosure. Method 350 may be implemented by a controller in an SDN. Method 350 may determine whether PRP traffic destined for a previously unknown host has been received at 352. Until PRP traffic designed for an unknown host is received, method 350 may remain at 352.

Upon receipt of PRP traffic destined for a previously unknown host, an SDN controller implementing method 350 may generate an ARP request including an RCT trailer and directed to the previously unknown host at 354. The ARP request may cause the previously known host to respond and provide its link layer address, such as a MAC address.

By causing the previously unknown host to respond to the ARP request, a device implementing method 350 may determine whether the previously unknown host is using PRP. If a single non-PRP packet is received at 356, a system implementing method 350 may confirm that the host is not using PRP at 360.

At 368, appropriate non-PRP communication flows may be identified and implemented. Where one device uses PRP and another device does not use PRP, only a single communication path between the devices may be implemented because both devices must use PRP to obtain the advantages provided by PRP.

If a pair of PRP packets are received in response to the ARP request at 358, a system implementing method 350 may confirm that the previously unknown host is using PRP at 362. Based on the determination that the host is using PRP, a system implementing method 350 may determine whether to establish PRP communication flows at 364. If PRP communication flows are to be established, appropriate PRP communication flows may be identified and implemented at 366.

Figure 4:
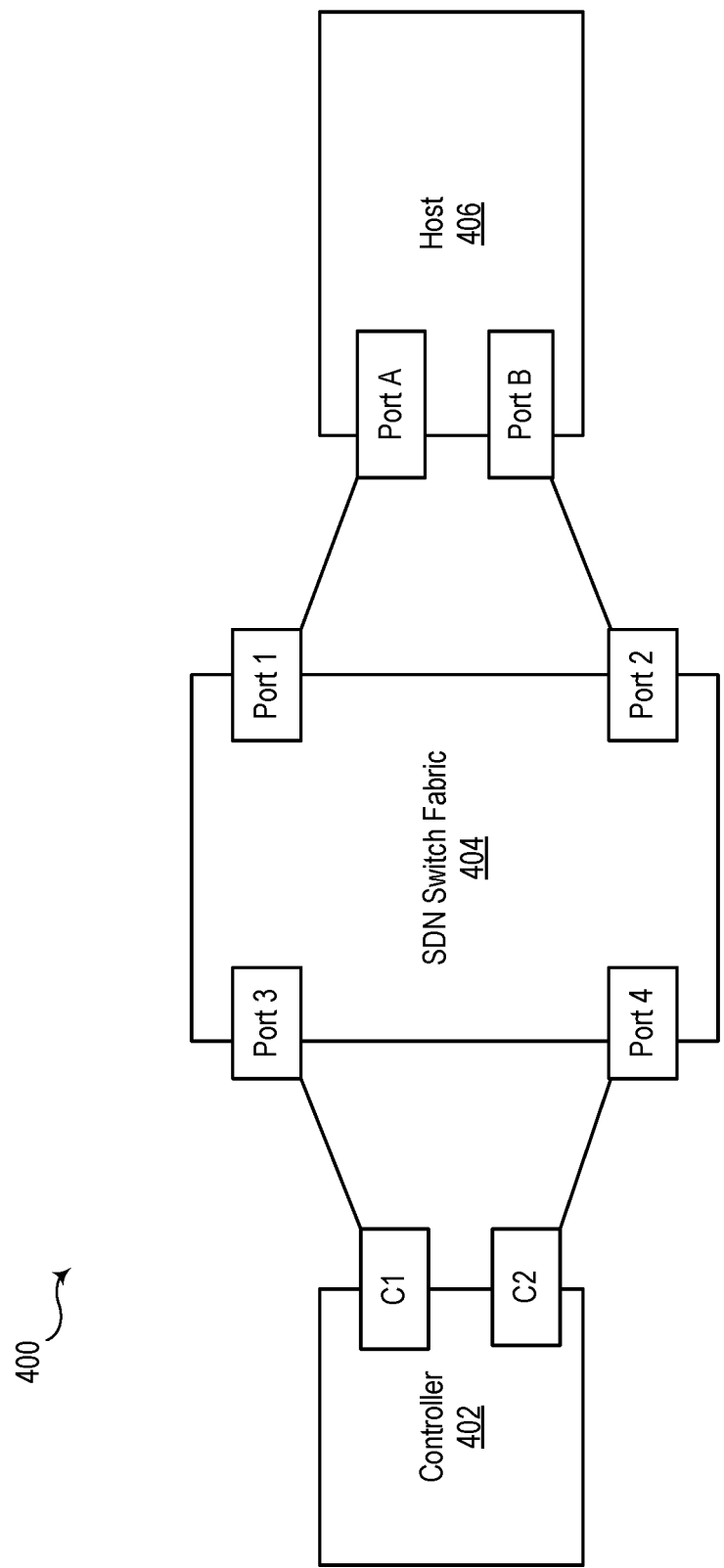
FIG. 4 illustrates a block diagram of a system including an SDN controller, an SDN, a plurality of network devices, and a plurality of hosts consistent with embodiments of the present disclosure.

FIG. 4 illustrates a block diagram of a system 400 to detect PRP devices with an SDN Controller 402 connected in-band to a network it is controlling, consistent with embodiments of the present disclosure. An in-band connection means that an SDN controller 402 configures SDN switch fabric 404. In other words, the SDN controller's 402 own communication manages the SDN switch fabric 404. It is unlikely that that SDN controller 402 (or a host 406 on which the SDN controller 402 is operating) will emit traffic that does not match any SDN flows and will be forwarded to the SDN controller 402 for network discovery purposes. In the illustrated embodiment, ports C1 and C2 are in a PRP configuration. SDN switch fabric 404 may comprise one LAN or two physically distinct LANs.

In various embodiments, a controller may operate on a host in system 400 that also performs other tasks. An in-band SDN controller 402 is unlikely to determine that it is operating a host device 406 configured for PRP communication. To detect configuration, a packet may be generated and egressed from controller 402 such that it is forwarded back to the controller 402. Flows that are forwarded to the SDN controller are communicated through the transport layer security ("TLS") connection the SDN controller has with the switch receiving the traffic. As such, the packets are not visible in their original form once they reach C1 or C2, but rather the packets are a byte stream in an encrypted TCP connection. The packets are received on port 1 and/or port 2 then are forwarded via the SDN protocol.

In one specific embodiment, controller 402 may send a PRP packet from SDN switch fabric 404 to itself to that will cause its network stack to respond. If PRP is configured, indicators will be returned (e.g., the packet will be formatted according to the PRP protocol) with the response that will allow controller 402 to determine whether communication according to the PRP protocol is enabled. PRP communication is handled Layer 2 in the Open Systems Interconnection ("OSI") model, and as such indicators of PRP communication are removed by the Network Interface Card ("NIC") before the packet is passed up the network stack. If a packet is returned over the TLS controller channel, however, the indicators of PRP communication are preserved can be analyzed by the controller.

Determining whether an SDN is operating on a host configured to communicate using PRP may be useful in a variety of situations. For example, controller 402 may run a syslog server, and host 406 may have a message to forward to controller 402 to include in the syslog. In this case, the syslog messages will be duplicated by PRP to provide redundancy. If the PRP path is not properly configured, the benefit of this redundancy cannot be utilized. Upon discovering the PRP configuration of the controller 402, network planning can be performed correctly to utilize this redundancy.

Figure 5:
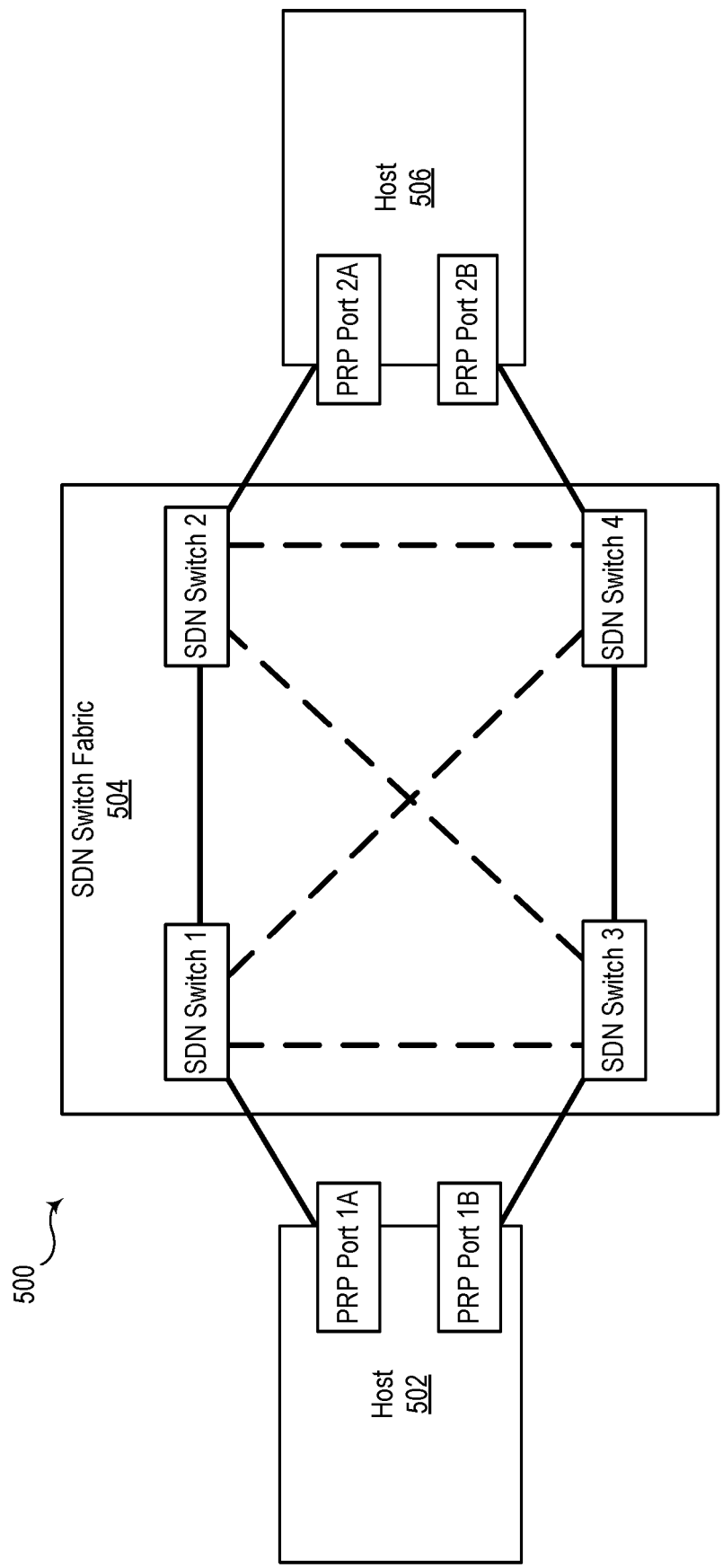
FIG. 5 illustrates a block diagram of a system in which physically separate PRP networks with interconnection links may be utilized to provide additional fault tolerance consistent with embodiments of the present disclosure.

FIG. 5 illustrates a block diagram of a system 500 in which physically separate PRP networks with interconnection links may be utilized to provide additional fault tolerance for a PRP communication channel between host 502 and host 506 consistent with embodiments of the present disclosure. The links illustrated with solid lines may indicate a typical PRP network setup implemented using traditional switches. The links illustrated with dashed lines may be added due to the use of SDN. Without SDN, the links illustrated in broken lines will prevent PRP from operating correctly because the interconnections may provide alternative paths that are not physical separate for routing traffic. As such, use of protocols (e.g., Rapid Spanning Tree Protocol) may fail to converge due to the existence of multiple paths through the network.

Using SDN allows a controller (not shown) to configure the switches, ensuring that network traffic follows a specified path, while still providing alternative paths for purposes of additional fault tolerance. For example, in typical operation, packets from PRP port 1A may be routed to SDN switch 1, then to SDN switch 2, and then to PRP port 2A. In the event of a failure of the link between SDN switch 1 and SDN switch 2, traffic may be routed from PRP port 1A to SDN switch 1, to SDN switch 4, to SDN switch 2, and finally to PRP port 2A.

Various embodiments consistent with the present disclosure may facilitate planning and visualization of PRP systems to route traffic through distinct nodes. For example, PRP port 1A is forwarded through switches 1 and 2 to PRP port 2A. PRP port 1B's outgoing traffic is forwarded through switch 3 and then switch 4 before being delivered to PRP port 2B. Using this scheme, any one switch can fail and PRP will still function as intended. This is also functionally equivalent to the typical practice of having two physically separate networks for PRP traffic.

The interconnections illustrated using dashed lines offer many paths through SDN switch fabric 504 that could result in a single point of failure. For example, traffic sent from PRP port 1A may be routed to switch 1, then to switch 2, then to PRP port 2A; and traffic sent from PRP port 1B may be routed to switch 3, then to switch 2, then to switch 4, and then to PRP port 2B. This routing scheme includes a single point of failure (i.e., switch 2). As such, if switch 2 fails, both PRP paths fail. In various embodiments consistent with the present disclosure, a visualization system may identify single points of failure and/or suggest paths that utilize physical distinct nodes.

Figure 6A:
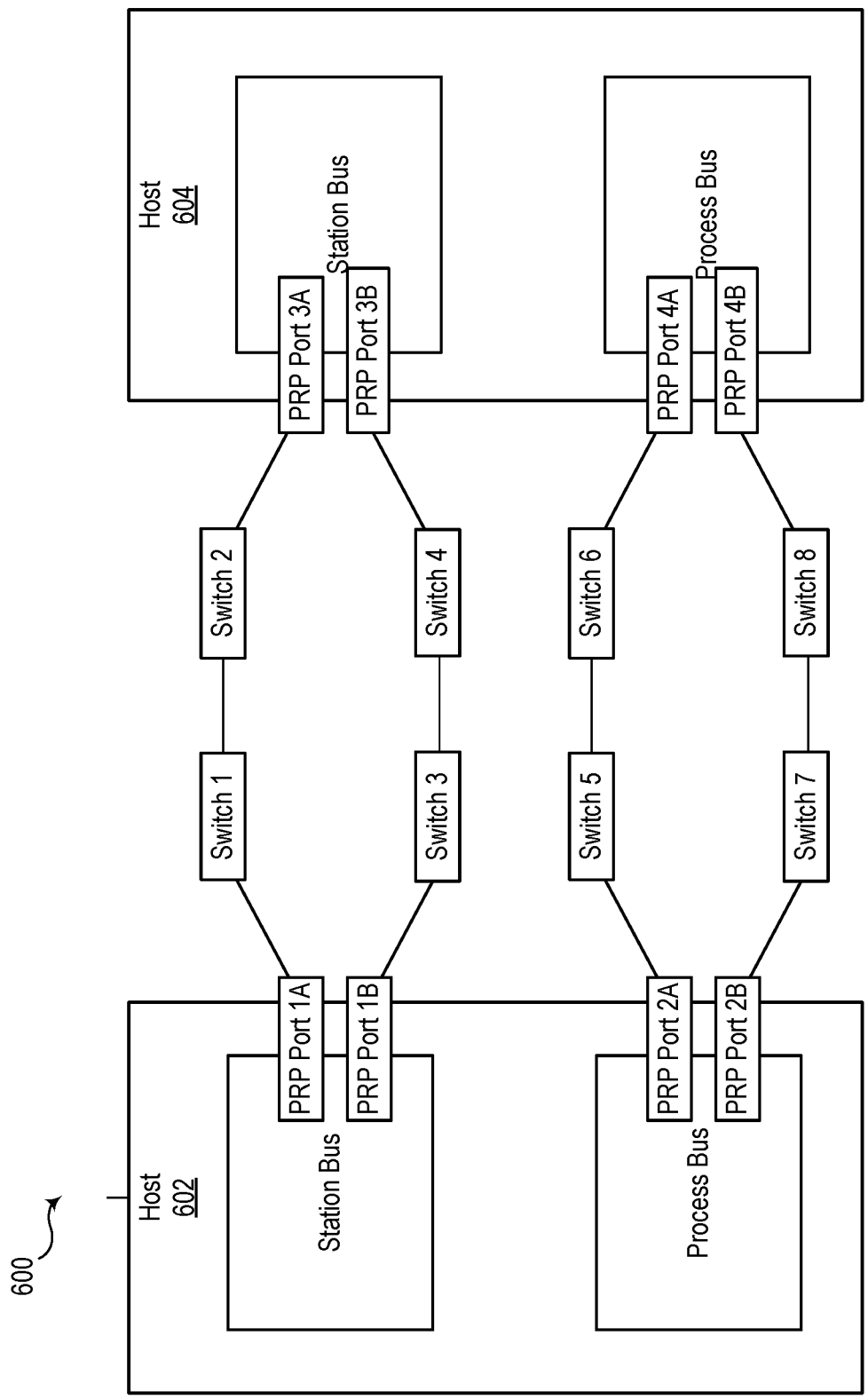
FIG. 6A illustrates a system including separate PRP paths for a station bus and a process bus between a first host and a second host consistent with embodiments of the present disclosure.

FIG. 6A illustrates a system 600 including separate PRP paths for a station bus and a process bus between host 602 and host 604 consistent with embodiments of the present disclosure. System 600 illustrates an application in which multiple PRP schemes are used (i.e., a separate PRP connection exists for both station and process bus functions). As illustrated, this scheme requires four distinct physical networks. A first physical network connects PRP port 1A and PRP port 3A using switch 1 and switch 2. A second physical network connects PRP port 1B and PRP port 3B using switch 3 and switch 4. A third physical network connects PRP port 2A and PRP port 4A using switch 5 and switch 6. Finally, a fourth physical network connects PRP port 2B to PRP port 4B using switch 7 and switch 8. System 600 may operate using traditional network devices because there is a single path for each PRP communication path.

While system 600 provides physically separate paths for PRP communications, systems and methods consistent with the present disclosure may optimize the configuration to improve efficiency using SDN. As described in connection with FIG. 5, an alternate configuration may be implemented to route traffic through physically distinct nodes. Systems consistent with the present disclosure may improve the efficiency of system 600 by creating multiple virtual PRP networks overlaid on the same physical network infrastructure.

Figure 6B:
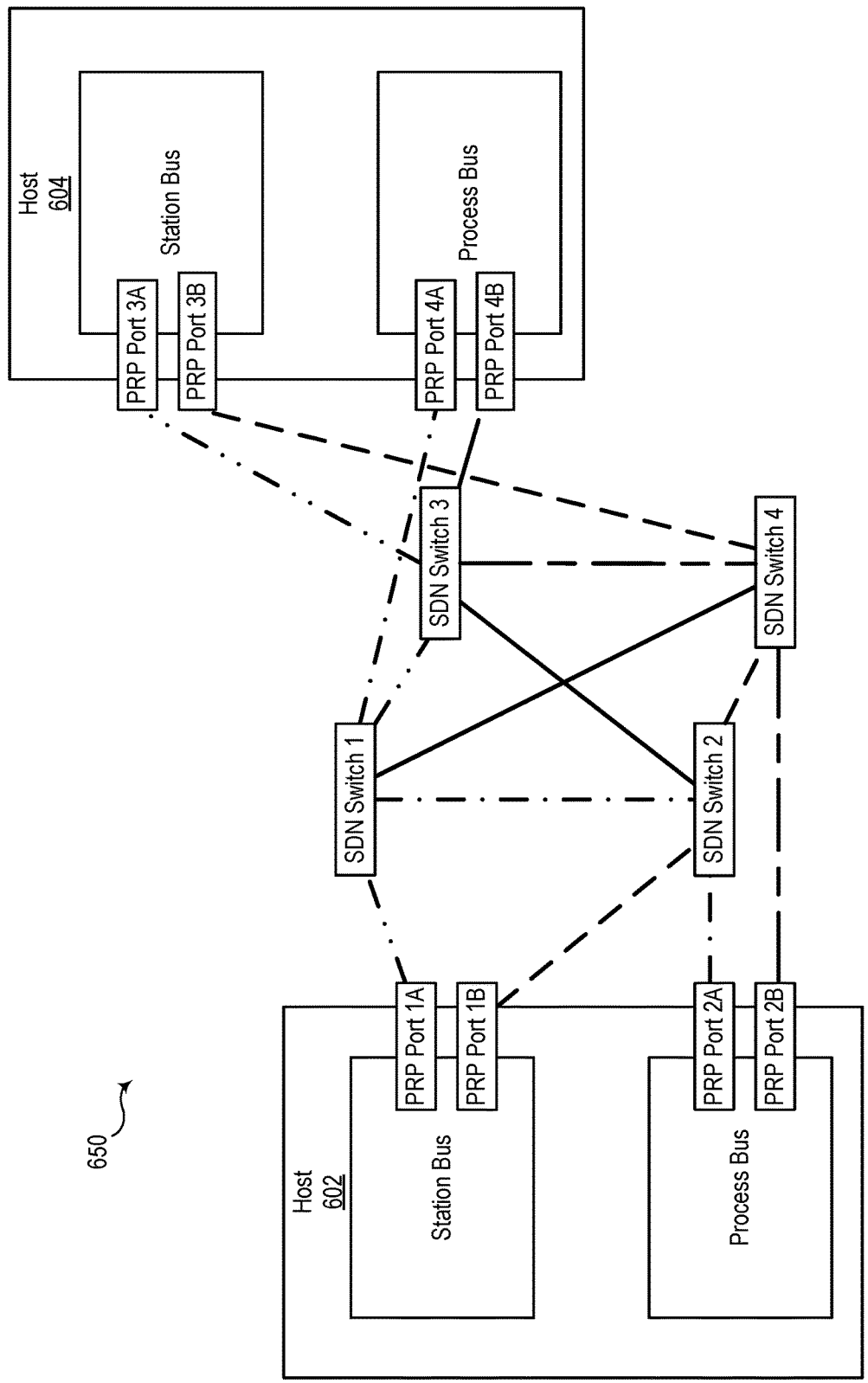
FIG. 6B illustrates an alternate configuration of a system consistent with the present disclosure that implements the four physically distinct networks shown in FIG. 6A between the first and second hosts.

FIG. 6B illustrates an alternate configuration of a system 650 consistent with the present disclosure that implements the four physically distinct networks shown in FIG. 6A between host 602 and host 604. A first network connection between PRP port 1A and PRP port 3A is illustrated using a line with a dash-dot-dot pattern. More particularly, communications between PRP port 1A and PRP port 3A may be routed through SDN switch 1 and SDN switch 3. A second network connection between PRP port 1B and PRP port 3B is illustrated using a dashed line. More particularly, communications between PRP port 1B and PRP port 3B may be routed through SDN switch 2 and SDN switch 4. A third network connection between PRP port 2A and PRP port 4A is illustrated using a line with a dash-dot pattern. More particularly, communications between PRP port 2A and PRP port 4A may be routed through SDN switch 2 and SDN switch 1. Finally, a fourth network connection between PRP port 2B and PRP port 4B is illustrated long a line with a long-dash-short-dash pattern. More particularly, communications between PRP port 2B and PRP port 4B are routed through SDN switch 4 and SDN switch 3.

All of the redundant communication paths in system 650 pass through distinct nodes, so that there is no single point of failure for redundant paths. For example, if SDN switch 1 fails, traffic between the station buses of host 602 and host 604 may still pass between PRP port 1B and PRP port 3B using SDN switch 2 and SCN switch 4. Similarly, if any other SDN switch fails, traffic may still pass through a redundant path without interruption. This level of redundancy is achieved using fewer SDN switches, and therefore can be implemented at a lower cost in comparison to system 600 illustrated in FIG. 6A.

Figure 7:
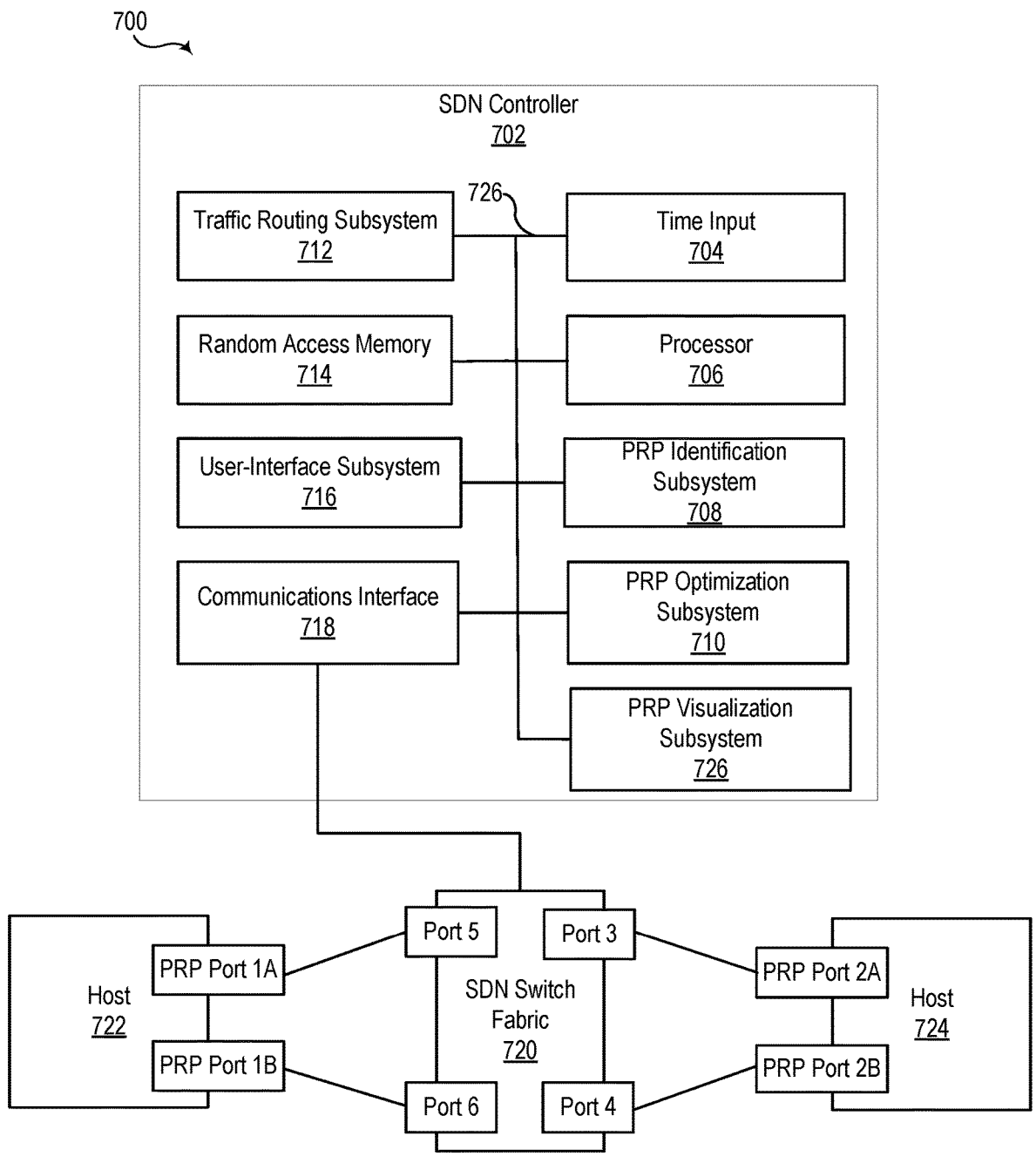
FIG. 7 illustrates a block diagram of a system including an SDN controller, an SDN switch fabric, and hosts consistent with embodiments of the present disclosure.

FIG. 7 illustrates a block diagram of a system 700 including an SDN controller 702, an SDN switch fabric 720, and hosts 722 and 724 consistent with embodiments of the present disclosure. In some embodiments, system 700 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

SDN controller 702 includes a communications interface 718 to communicate with SDN switch fabric 720. Communications interface 718 may facilitate communications with multiple devices (not shown). SDN controller 702 may further include a time input 704, which may be used to receive a time signal (e.g., a common time reference) allowing SDN controller 702 to apply a time-stamp to received data. In certain embodiments, a common time reference may be received via communications interface 718, and accordingly, a separate time input may not be required. One such embodiment may employ the IEEE 1588 protocol. A data bus 726 may facilitate communication among various components of SDN controller 702.

Processor 706 may be configured to process communications received via communications interface 718 and time input 704 and to coordinate the operation of the other components of SDN controller 702. Processor 706 may operate using any number of processing rates and architectures. Processor 706 may be configured to perform any of the various algorithms and calculations described herein. Processor 706 may be embodied as a general-purpose integrated circuit, an application-specific integrated circuit, a field-programmable gate array, and/or any other suitable programmable logic device.

Instructions to be executed by processor 706 may be stored in random access memory (RAM) 714. Such instructions may include information for processing routing and processing data packets received via communications interface 718 based on a plurality of traffic flows. In some embodiments, traffic that does not match a plurality of traffic flows may be routed to SDN controller 702 for additional analysis and/or action.

A user-interface subsystem 716 may be configured to receive from a user various types of information relating to configuring SDN switch fabric 720. In some embodiments, the user-interface subsystem 716 may be configured to confirm or reject the creation of communication flows related to PRP communication. The communication flows to be confirmed may be identified by SDN controller 702 during the operation of system 700.

A traffic routing subsystem 712 may be configured to generate a variety of communication flows implemented by SDN switch fabric 720. The traffic routing subsystem 712 may specify the configuration of a variety of intermediate devices (e.g., routers, switches, multiplexers, etc.), separating communicating hosts 722 and 724. The traffic routing subsystem 712 may be configured to generate physically distinct paths for traffic flows among PRP traffic in system 700. For example, host 722 may provide a redundant stream of data to host 724. A first redundant stream of data may be transmitted from PRP port 1A to port 5 and from port 3 to PRP port 2A. A second redundant stream of data may be transmitted from PRP port 1B to port 6 and from port 4 to PRP port 2B. In some embodiments the communication flows may be implemented such that parallel communication flows between host 722 and host 724 pass through distinct physical links and/or distinct switches in SDN switch fabric 720.

A PRP identification subsystem 708 may identify traffic in system 700. In some embodiments, PRP identification subsystem 708 may monitor traffic transmitted by host 722 to host 724 to determine that the traffic comprises at least one pair of redundant data packets that conforms to PRP. Packets that conform to PRP may include information that allows a receiving device to identify and discard duplicate frames. Such information may include a sequence number and/or other type of information. In various embodiments, PRP identification subsystem 708 may allow for passive detection of PRP traffic. Alternatively, SDN controller 702 may interrogate host 722 and/or host 724 to solicit a response in PRP format. In one specific embodiment, the interrogation may comprise generating an ARP request directed to one of host 722 and 724 and analyzing a response.

A PRP optimization subsystem 710 may generate configurations of traffic flows that utilize distinct communication links and/or switches to avoid single points of failure. Such optimization may improve redundancy within a system without requiring additional hardware, as discussed in connection with FIG. 5 and FIG. 6B.

A PRP visualization subsystem 726 may provide a visual representation of networks to facilitate design and planning of a network configurations. In some embodiments, a visualization may identify single points of failure and/or suggest paths that utilize physical distinct nodes for PRP communications. Such a visualization may allow a user to ensure that communication flows avoid single points of failure.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system operable to identify a communication host in a software defined network (SDN) configured to communicate using a parallel redundancy protocol (PRP), the system comprising:
   a network in communication with a first communication host and a second communication host, the network comprising a plurality of switches interconnected with a plurality of physical links; and an SDN controller in communication with the network, the SDN controller comprising:
  a PRP identification subsystem to:
    identify a PRP packet from the first communication host and destined for the second communication host;
    generate a first address resolution protocol (ARP) message that conforms to PRP and directed to the second communication host;
    receive a first response from the second communication host to the ARP message, the first response comprising at least one packet that conforms to PRP; and
  a traffic routing subsystem to create a plurality of communication flows between the first communication host and the second communication host to route PRP traffic between the first communication host and the second communication host.

2. The system of claim 1, wherein the PRP identification subsystem selectively monitors traffic from the first host upon discovery to identify the PRP packet as at least one data packet that conforms to PRP and determines that the first communication host is configured to operate using PRP based on the at least one data packet that conforms to PRP.

3. The system of claim 1, further comprising a third communication host and wherein the PRP identification subsystem is further configured to:
  generate a second ARP message that conforms to PRP and directed to the third communication host; and
  receive a second response from the third communication host to the second ARP message, the second response comprising a single packet that does not conforms to PRP;
  wherein the traffic routing subsystem is further configured to create a plurality of communication flows between the first host and the third host to route non-PRP traffic between the first communication host and the third communication host.

4. The system of claim 1, wherein the traffic routing subsystem is configured to create the plurality of communication flows without user intervention.

5. The system of claim 1, further comprising a user interface subsystem to prompt an operator to accept at least one of the plurality of communication flows before creation of the communication flow between the first communication host and the second communication host.

6. The system of claim 1, wherein the plurality of communication flows comprises at least one communication flow to enable transmission of PRP supervisory frames between the first communication host and the second communication host.

7. The system of claim 1, wherein at least one of the first communication host and the second communication host comprises a relay in an electric power system.

8. The system of claim 1, further comprising a PRP optimization subsystem to identify parallel communication paths between the first communication host and the second communication host that utilize distinct physical communication links;
  wherein the traffic routing subsystem is configured to implement the plurality of communication flows between the first communication host and the second communication host utilizing the distinct physical communication links.

9. The system of claim 8, wherein the PRP optimization subsystem is further configured to identify parallel communication paths between the first communication host and the second communication host that utilize distinct switches;
  wherein the traffic routing subsystem is configured to implement the plurality of communication flows between the first communication host and the second communication utilizing the distinct switches.

10. The system of claim 1, wherein the PRP identification subsystem is further configured to determine that at least one packet the traffic comprises at least one pair of redundant data packets, and to determine that the at least one pair of redundant data packets that conforms to PRP.

11. The system of claim 1, wherein the response from the second communication host comprises a pair of packets, the pair of packets comprising a response packet from a LAN A port and a response packet from a LAN B port;
  wherein the traffic routing subsystem is further configured to:
    route traffic from the LAN A port of the second communication host to a LAN A port of the first communication host, and
    route traffic from the LAN B port of the second communication host to a LAN B port of the first communication host.

12. A method for identifying a communication host in a software defined network (SDN) configured to communicate using a parallel redundancy protocol (PRP), the method comprising:
  providing a network in communication with a first communication host and a second communication host, the network comprising a plurality of switches interconnected with a plurality of physical links;
  providing an SDN controller in communication with the network;
  identifying, using a PRP identification subsystem of the SDN controller, a PRP packet from the first communication host and destined for the second communication host;
  generating, using the PRP identification subsystem, a first address resolution protocol (ARP) message that conforms to PRP and directed to the second communication host;
  receiving, using the PRP identification subsystem of the SDN controller, a first response from the second communication host to the ARP message, the first response comprising at least one packet that conforms to PRP; and
  creating, using a traffic routing subsystem of the SDN controller, a plurality of communication flows between the first communication host and the second communication host to route PRP traffic between the first communication host and the second communication host.

13. The method of claim 12, further comprising:
  monitoring, using the PRP identification subsystem of the SDN controller, traffic from the first host upon discovery;
  and
  determining that the first communication host is configured to operate using PRP based on the PRP packet.

14. The method of claim 12, further comprising:
  providing a third communication host in communication with the network;
  generating a second ARP message that conforms to PRP and directed to the third communication host;

receiving a second response from the third communication host to the second ARP message, the second response comprising a single packet that does not conform to PRP; and creating, using the traffic routing subsystem of the SDN controller, a plurality of communication flows between the first host and the third host to route non-PRP traffic between the first communication host and the third communication host.

15. The method of claim 12, wherein creating the plurality of communication flows is performed without user intervention.

16. The method of claim 12, further comprising prompting an operator, using a user interface subsystem, to accept at least one of the plurality of communication flows before creating the communication flow between the first communication host and the second communication host.

17. The method of claim 12, wherein the plurality of communication flows comprises at least one communication flow to enable transmission of PRP supervisory frames between the first communication host and the second communication host.

18. The method of claim 12, wherein at least one of the first communication host and the second communication host comprises a relay in an electric power system.

19. The method of claim 12, further comprising:
identifying, using a PRP optimization subsystem, parallel communication paths between the first communication host and the second communication host that utilize distinct physical communication links;
wherein the plurality of communication flows between the first communication host and the second communication host utilizes the distinct physical communication links.

20. The method of claim 19, further comprising:
identifying, using the PRP optimization subsystem, parallel communication paths between the first communication host and the second communication host that utilize distinct switches;
wherein the plurality of communication flows between the first communication host and the second communication utilizes the distinct switches.

21. The method of claim 12, further comprising, determining, using the PRP identification subsystem of the SDN controller, that at least one packet the traffic comprises at least one pair of redundant data packets, and determining that the at least one pair of redundant data packets that conforms to PRP.

22. The method of claim 12, wherein the response from the second communication host comprises a pair of packets, the pair of packets comprising a response packet from a LAN A port and a response packet from a LAN B port, and further comprising:
routing traffic from the LAN A port of the second communication host to a LAN A port of the first communication host, and
routing traffic from the LAN B port of the second communication host to a LAN B port of the first communication host.

* * * * *